United States Patent
Wijnberg

(10) Patent No.: US 8,147,756 B2
(45) Date of Patent: Apr. 3, 2012

(54) DEVICE FOR CARRYING OUT A CHEMICAL OR PHYSICAL TREATMENT

(75) Inventor: Bernard Pieter Wijnberg, Haarlem (NL)

(73) Assignee: Outotec Oyj, Espoo (FI)

( * ) Notice: Subject to any disclaimer, the term of this patent is extended or adjusted under 35 U.S.C. 154(b) by 791 days.

(21) Appl. No.: 10/571,593

(22) PCT Filed: Sep. 13, 2004

(86) PCT No.: PCT/NL2004/000632
§ 371 (c)(1), (2), (4) Date: Jul. 26, 2006

(87) PCT Pub. No.: WO2005/025738
PCT Pub. Date: Mar. 24, 2005

(65) Prior Publication Data
US 2007/0036677 A1    Feb. 15, 2007

(30) Foreign Application Priority Data
Sep. 12, 2003  (NL) .................................. 1024281

(51) Int. Cl.
*B01D 15/02*    (2006.01)
(52) U.S. Cl. .......... 422/64; 422/269; 210/264; 210/278; 210/91; 137/625.46; 137/625.15
(58) Field of Classification Search ................. None
See application file for complete search history.

(56) References Cited

U.S. PATENT DOCUMENTS

| 5,069,883 A | * | 12/1991 | Matonte | 422/269 |
| 5,424,037 A | | 6/1995 | Zimmermann et al. | |
| 5,676,826 A | * | 10/1997 | Rossiter et al. | 210/91 |
| 6,527,946 B1 | * | 3/2003 | Wijnberg | 210/91 |

FOREIGN PATENT DOCUMENTS

| DE | 196 33 709 A1 | 2/1998 |
| DE | 202 09 129 U1 | 10/2002 |
| GB | 734357 | 7/1955 |

* cited by examiner

*Primary Examiner* — P. Kathryn Wright
(74) *Attorney, Agent, or Firm* — Buchanan Ingersoll & Rooney PC

(57) ABSTRACT

Device for carrying out a chemical or physical treatment, comprising a frame on which a turntable is arranged rotatably. The reaction vessels are arranged on the turntable, and a different connection between the feed/discharge lines, which are fixedly connected to the frame, and the reaction vessels is constantly provided via a valve assembly. The valve assembly comprises two disks, each provided with ports which are positioned opposite one another in constantly changing positions. In order to minimize the non-operational time, an indexing movement is carried out using the turntable. In the case of relatively large installations, to prevent associated forces from affecting the movement of the valve assembly, it is proposed that the valve assembly be fitted directly on the turntable and that the turntable be driven directly by the motor.

14 Claims, 2 Drawing Sheets

DEVICE FOR CARRYING OUT A CHEMICAL OR PHYSICAL TREATMENT

Figure 1:
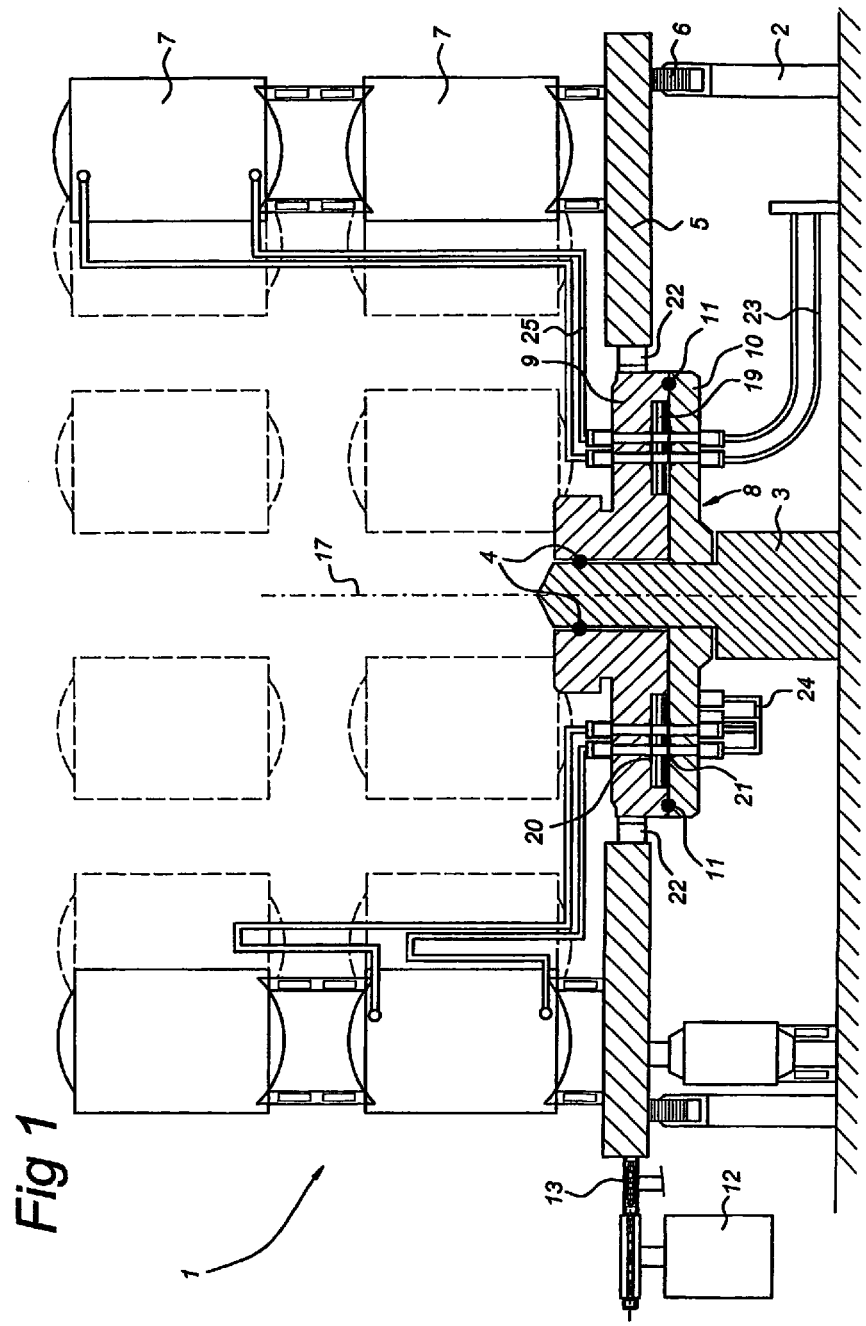

The present invention relates to a device for carrying out a chemical or physical treatment, comprising a stationary frame with a turntable arranged on the frame such that it can rotate about a center axis, on which turntable there is a number of reaction vessels, a valve assembly being present, the valve assembly comprising a disk-like, rotatable valve part, arranged concentrically with respect to the said center axis, and a stationary valve part, which is positioned opposite the rotatable valve part and is connected to the frame, each valve part being provided with ports which are moved to be opposite one another in a changing order, connections being present between the rotatable valve part and the said reaction vessels and between the stationary valve part and feed/discharge lines, as well as a motor for the indexing movement of the said rotating valve part, which motor is connected to the said rotating valve part via a transmission.

A device of this type is generally known in the prior art. The direction of flow relative to and the medium used for the vessel can be altered as desired by means of the openings in the different plates of the valve assembly being moved into a position in which they lie opposite one another. Since full through-flow is only possible in the position in which the ports lie opposite one another, it is aimed for the period in which the flow connection is blocked during rotation to be minimized. This is possible by enabling the valve assembly to execute an indexing movement. In the case of relatively small laboratory installations, it is possible not only to enable the valve assembly to execute an indexing movement of this type, but also to allow the vessels or columns to do so.

In the case of larger installations, however, the inertia forces are so great that if the shaft on which the valve assembly and the turntable are arranged is driven in an indexing movement, the deformations are such that accurate control is no longer possible.

To avoid this problem, it is proposed in the prior art for the driving of the valve assembly and of the turntable to be decoupled from one another. In this case, the heavy turntable (weight upward of several tons) can execute a continuous, uniform movement, and the valve assembly can execute the indexing movement described above. In this case, however, it is necessary to provide complicated structures. Moreover, it is necessary to provide flexible connecting lines between the valve assembly and the turntable. This makes the design complicated, susceptible to damage and expensive.

The object of the present invention is to provide a device which can be considerably scaled up and can be produced with a particularly simple design yet nevertheless allows an indexing movement to be carried out.

In a device as described above, this object is achieved by virtue of the fact that the said transmission comprises a circular part of the said turntable, the said rotating valve part being directly connected to the said turntable.

According to the present invention, it is no longer necessary for a shaft on which both the turntable and the valve assembly are arranged to be driven, but rather the turntable is driven directly. Such a drive is preferably effected with toothing arranged along the circumference of the turntable. It has been found that in the prior art there are (servo)motors which can execute the desired indexing movement. However, it has been found that the forces which are transmitted to the turntable by the shaft in a known design, when driving a shaft of this type, are so great that torsion means that the valve assembly is no longer always moved into the correct position. If, in accordance with the present invention, the turntable is now driven directly at its circumference, it is possible to prevent torsion of this nature. After all, the circumference of the turntable is much larger than the diameter of a central shaft. As an example, values of over 2 m may be mentioned. A drive of this type can easily be effected using a toothed belt, chain or the like. A corresponding toothing is arranged in the vicinity of the circumference of the turntable.

According to an advantageous embodiment, on or in the vicinity of the circumference or elsewhere on the turntable or rotating valve part, there are position sensor means which interact with corresponding position sensor means on the frame, by means of which the servomotor can be either actuated or if appropriate corrected. The device described above is particularly suitable for relatively heavy machines. One example of such a machine is a device in which the turntable has a diameter of approximately ten meters and a weight of up to 350 tons.

To execute the indexing movement, the servomotor is preferably designed in such a manner that its speed is gradually variable (soft start), so that the loading on the device is minimized.

With the present invention, it is no longer necessary to use flexible hoses, and it is possible to make do with a relatively short, simple bearing of the turntable.

Figure 2:
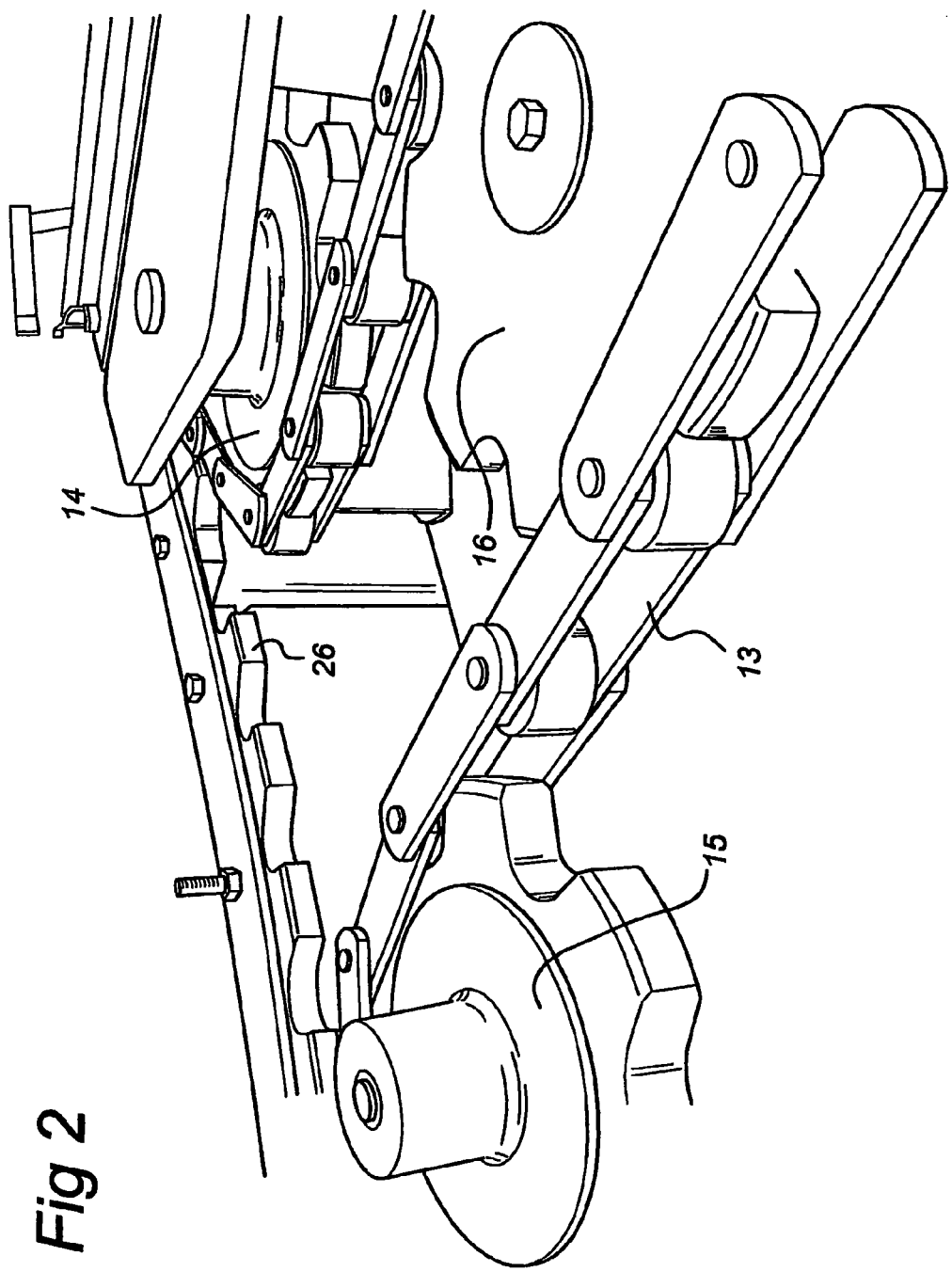

The invention will be explained below with reference to an exemplary embodiment illustrated in the drawing, in which:

FIG. 1 diagrammatically depicts a device according to the present invention; and FIG. 2 depicts a detail of the drive for the turntable.

In FIG. 1, 1 denotes the device for carrying out a chemical or physical treatment. It will be understood that this treatment may comprise any treatment using vessels or columns. Vessels of this type have to be regularly regenerated, purged, etc. For this purpose, the vessels or columns 7 are arranged on a rotatable turntable 5. Rotatable turntable or turret 5 rests, via rollers 6, on a stationary frame 2, on which a journal 3 is also arranged. The axis of rotation is denoted by 17. 8 denotes a valve assembly which is in part arranged rotatably. The rotatable part of the valve assembly is denoted by 9, and the stationary part is denoted by 10. The rotatable part 9 is mounted via bearings 4, 11 in the journal 3 and stationary part 10, respectively. There is a TEFLON, i.e., PTFE, sliding plate 19 which is connected either to the stationary part or to the rotating part 9 of the valve assembly. In each valve plate, there are a large number of openings arranged on (concentric) circles, and each of these openings or ports are denoted by 20 and 21. When these openings are located opposite one another, a fluid connection is created between the lines 23 which extend from the frame and the lines 25 which provide a connection between the rotatable valve part and the vessels 7. There may also be auxiliary lines 24, allowing series connection of the various columns 7. As is generally known in the prior art, all kinds of connections can be realized between the lines and the surroundings 23 and the columns with the valve assembly.

The rotating valve part 9 is connected to the carousel 5 via a damping part, such as a rubber block 22. Turntable 5 is provided with external toothing 26 (cf. FIG. 2), on which a drive chain 13 acts, the drive chain 13 in turn being coupled to servomotor 12, which is controlled with the control unit 18. As can be seen from FIG. 2, there is an adjustment roller 14 for the chain and a tensioning roller 15.

Information relating to the position of the turntable with respect to the frame is transmitted to control unit 18 in a manner which is not illustrated in more detail. On the basis of this information, the servomotor can execute a correction, or the servo motor can be controlled itself on the basis of this information.

Since it is always desirable to provide a fluid connection between the vessel 7 and the environment or between the various vessels (albeit in a number of different circuit connections), the time for which the openings are not aligned should be minimized. To achieve this, the rotary movement of the rotatable valve part is carried out on an indexing basis, i.e. the openings 20, 21 are positioned opposite one another for a relatively long period of time, whereas movement to the next position only takes a relatively short time.

Since the design of turntable and vessels produces a relatively high weight, considerable torsion would be produced in a shaft if the assembly were to be driven with the aid of such a shaft. According to the invention, however, the turntable is driven directly at its outer circumference, i.e. the turntable structure is subject to scarcely any torsional load. It has been found that the prior art uses such heavy motors that an indexing movement of this type can be imparted to structures even weighing several hundred tons. Since the rotating valve part 9 is directly connected to the turntable, it also accurately follows this movement. It is preferable for there to be no rigid shaft structure between the rotatable valve part 9 and the turntable 5.

In the manner described above, it is likewise possible to design relatively large installations in a particularly simple way.

Although the invention has been described above in the form of a preferred embodiment, it should be understood that numerous modifications can be made to this embodiment without departing from the scope of the present application. Modifications of this nature will be obvious to the person skilled in the art and lie within the scope of the appended claims.

The invention claimed is:

1. Device for carrying out a chemical or physical treatment, comprising:
   a plurality of reaction vessels,
   a turntable comprising a circular plate having an external toothing attached to a vertical side circumference of said plate, the upper surface of said plate supports said plurality of reaction vessels,
   a stationary frame with said turntable arranged on the frame such that said turntable can rotate about a center axis,
   a valve assembly comprising a disk-shaped, rotatable valve part, which is arranged concentrically with respect to said center axis and is connected to said turntable, and a stationary valve part, which is positioned opposite said rotatable valve part and is connected to said frame, wherein rotation of said rotatable valve part moves ports of said rotatable valve part to be opposite ports of said stationary valve part, and connections are present between said rotatable valve part and said reaction vessels and between said stationary valve part and feed/discharge lines, and
   a motor is coupled to a toothed belt or chain, said toothed belt or chain is coupled to said external toothing of said turntable, to thereby impart an indexing movement to said rotatable valve part.

2. Device as claimed in claim 1, wherein said motor comprises a servomotor.

3. Device as claimed in claim 2, wherein a shaft stub extends from said frame, on which said turntable is journalled.

4. Device as claimed in claim 3, wherein said rotatable valve part lies substantially in the same plane as said turntable.

5. Device as claimed in claim 4, wherein said turntable comprises a circular plate with a diameter of at least 2 m.

6. Device as claimed in claim 5, comprising tensioning means for said toothed belt or chain.

7. Device as claimed in claim 6, wherein said turntable comprises a circular disk inside which said rotatable valve part is arranged.

8. Device as claimed in claim 7, wherein damping drive means are arranged between said rotatable valve part and said circular disk.

9. Device as claimed in claim 1, wherein a shaft stub extends from said frame, on which said turntable is journalled.

10. Device as claimed in claim 1, wherein said rotatable valve part lies substantially in the same plane as said turntable.

11. Device as claimed in claim 1, wherein said turntable comprises a diameter of at least 2 m.

12. Device as claimed in claim 1, wherein a tensioning means is provided for said toothed belt or chain.

13. Device as claimed in claim 1, wherein said turntable comprises a circular disk inside which said rotatable valve part is arranged.

14. Device as claimed in claim 1, wherein damping drive means are arranged between said rotatable valve part and said turntable.

* * * * *